(12) United States Patent
Yeh (10) Patent No.: US 9,176,262 B2
(45) Date of Patent: Nov. 3, 2015

(54) LIQUID COMBINATION FOR DIELECTRIC LIQUID LENS

(75) Inventor: Jer-Liang Yeh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 13/546,213

(22) Filed: Jul. 11, 2012

(65) Prior Publication Data

US 2013/0094094 A1 Apr. 18, 2013

(30) Foreign Application Priority Data

Oct. 17, 2011 (TW) .............................. 100137458 A (51) Int. Cl.
*G02B 1/06* (2006.01)
*G02B 3/12* (2006.01)
*G02B 3/14* (2006.01)
*G02B 1/04* (2006.01)

(52) U.S. Cl.
CPC . *G02B 3/14* (2013.01); *G02B 1/041* (2013.01)

(58) Field of Classification Search
CPC ........... G02B 1/041; G02B 3/14; C08L 83/04
USPC .................................................. 359/665, 666
See application file for complete search history.

(56) References Cited

U.S. PATENT DOCUMENTS

| 2007/0177276 A1* | 8/2007 | Liogier D'ardhuy et al. | 359/666 |
| 2008/0097143 A1* | 4/2008 | Califorrniaa ................... | 600/22 |
| 2008/0204890 A1* | 8/2008 | Kuiper et al. ................. | 359/665 |

FOREIGN PATENT DOCUMENTS

| CN | 101180555 | | 5/2008 |
| CN | 101349810 A | * | 1/2009 |
| CN | 101395495 | | 3/2009 |
| CN | 101995631 | | 3/2011 |
| TW | 200739133 | | 10/2007 |

OTHER PUBLICATIONS

TW Office Action mailed Jan. 14, 2014 for TW Application No. 1032005230001.
English Translation of the Abstract for CN101180555 filed May 14, 2008.
English Translation of the Abstract for TW200739133 filed.
English translation of the Abstract for CN 101995631 filed Mar. 30, 2011.
English translation of the Abstract for CN 101395495 filed Mar. 25, 2009.
Office Action for JP 100101 mailed Aug. 5, 2014.

* cited by examiner

*Primary Examiner* — Ricky Mack
*Assistant Examiner* — Mustak Choudhury
(74) *Attorney, Agent, or Firm* — Thomas | Horstemeyer, LLP (57) ABSTRACT

The invention discloses liquid combination for liquid lens. The liquid combination comprises an oil phase liquid and an aqueous phase liquid. The oil phase liquid comprises a silicon oil polymerized by siloxane. The aqueous phase liquid comprises a solution mixed with alcohol and water. Due to the liquid lens atomized and opaque by emulsion, the recovering time of the liquid lens from the emulsion will affect the performance of the liquid lens hugely. Accordingly, the recovering time is a performance index of the liquid lens. The liquid combination of the invention for the liquid lens can meet the specification and have the fast speed which is recovered from the emulsion.

6 Claims, 8 Drawing Sheets

| PHYSICAL REQUIRMENT | WORKING PRINCIPLE |
|---|---|
| Equal density | working fluid can stack on the substrate without affected by the gravity and the buoyancy at static equilibrium |
| High refractive difference | at the same of the surface curvature, the changing range of focal length optical power with high optical power value |
| Low Capacitivity difference | at the same voltage, the variance of the surface curvature can be increased, the opearating valtage can be decreased by high difference value of dielectric coefficient |
| Low viscosity | reaction time of curvature change becomes short, the opearating speed becomes fast |
| Low Thermal expansion coefficient And Low Volatile | meet the requirements of safety and scale stability |
| High Boiling point and low freezing point | temperature range for opearating and maintianing the status of liquid |
| Low conductivity | requirement of the work mechanism |

FIG. 4

|  | Specification | Working Liquid | Packaging Liquid | Difference |
|---|---|---|---|---|
| Main parameters | Colour | Colorless transparent | Colorless transparent | -- |
| | Density (g/cm³) | 0.95~1.1 | 0.95~1.1 | <0.003 |
| | Refractive | >1.5 | <1.4 | >0.1 |
| | Capacitivity (F/cm²) | <5 | >30 | >30 |
| | Working temperature (°C) | -20~70 | | -- |
| | Storing temperature (°C) | -40~85 | | -- |
| Secondary parameters | viscosity (c.p) | <10 | | -- |
| | Oil-water interface tension (mN/m) | <20 | | Initial contact angle <30 |
| | Conductibility (uS/m) | <1 | | -- |
| | Rate of penetration of light | >96% | | -- |
| Others | Freezing point (°C) | <-40 | | -- |
| | Boiling point (°C) | >100 | | -- |

FIG. 5

| Specification | Requirment | Chemical Liquid |
|---|---|---|
| Low Viscosity | < 60 c.p | DC704, DC-200-5CS, KF-9901, x-22-164, organic compound |
| High Refractive | > 1.45 | DC704, DC705, DC550, HI-VAC-F-5, organic compound |
| Low Conductibility | -- | All silicon Oil, Organic Compound |
| High Boiling point | -- | All silicon oil |
| Low Freezing point | -- | All silicon oil |
| Low Capacitivity | -- | All silicon Oil, Organic Compound |

FIG. 6

| Boiling point (°C) | Density (mg/cm$^3$) | Refractive | Viscosity (c.p) | Surface tension (mN/m) |
|---|---|---|---|---|
| 300 | 1057 | 1.59 | 39 | 37.3 |

FIG. 7

| Specification | Requirment | Chemical Liquid |
|---|---|---|
| Low Viscosity | < 60 c.p | deionized water, diethylene glycol, propanol, 1,3-propylene glycol, diethylene glycol, triethylene glycol, tetraethylene glycol |
| Low Refractive | < 1.4 | deionized water, propanol |
| Low Conductibility | <10 µS | deionized water, propanol, 1,3-propylene glycol, diethylene glycol, triethylene glycol, tetraethylene glycol |
| High Boiling point | > 150 °C | diethylene glyco, propylene glycol, diethylene glycol, triethylene glycol, tetraethylene glycol |
| Low Freezing point | < -60 °C | propylene glycol |
| High Capacitivity | > 45 F/cm$^2$ | deionized water, diethylene glycol, diethylene glycol |

FIG. 8

|  | deionized Water | | | | | |
|---|---|---|---|---|---|---|
| alcohol | 1,3-propylene glycol | glycerol | diethylene glycol | diethylene glycol | triethylene glycol | tetraethylene glycol |
| weight percent (%) | >38 | 45-80 | 41-91 | 47-90 | 52-83 | 48-60 |
| freezing Point (°C) | <-20 | | | | | |

FIG. 9

| | Oil phase Liquid | | Water phase Liquid |
|---|---|---|---|
| Liquid Combination | silicon oil polymerized by siloxane | Liquid phase Organic Compound | 40%, 50 %, 60% 1,3-propylene glycol liquid |
| | DC704 | toluene | 40%, 50 %, 60% gycerol liquid |
| | | o-xylene | 40%, 50 %, 60% diethylene glycol liquid |
| | | m-xylene | |
| | | 1-bromo-3-chlorobenzene | 40%, 50 %, 60% diethylene glycol liquid |
| | | 1,3-dichlorobenzene | 40%, 50 %, 60% triethylene glycol liquid |
| | | dibromohexane | 40%, 50 %, 60% tetraethylene glycol liquid |
| | | 1-chloronaphthalene | |
| | | bromobenzene | |
| | | 1,10-dichlorodecane | |

FIG. 10

LIQUID COMBINATION FOR DIELECTRIC LIQUID LENS

CROSS-REFERENCE TO RELATED APPLICATION

This application claims priority to and the benefit of Taiwan Application Serial Number 100137458, filed on Oct. 17 2011, which is incorporated by reference in its entirety.

BACKGROUND OF THE INVENTION

1. Field of the Invention

The present invention relates to a liquid combination. More particularly, the present invention relates to a liquid combination for a dielectric liquid lens.

2. Description of the Prior Art

A liquid lens is a lens with an adjustable focal length. Generally, the liquid lens can be classified into electro-wetting liquid lens and dielectric liquid lens.

Figure 1:
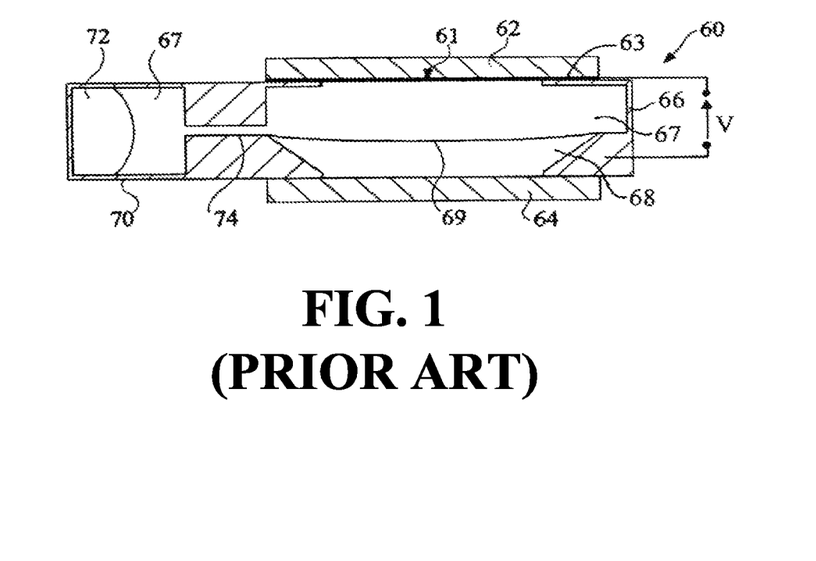
FIG. 1 illustrates a cross sectional view of an electro-wetting liquid lens in prior art.

FIG. 1 illustrates a cross sectional view of an electro-wetting liquid lens in prior art. As shown FIG. 1, the Republic of China patent application with the publication number of 200706917 discloses an electro-wetting liquid lens 60, one end of the electro-wetting liquid lens 60 has an expansion chamber 70, which is connected with the liquid lens 60 having packing fluid 67 disposed therein so as to accommodate the fluid overflowed caused by the expansion thereof. However, the expansion chamber 70 disposed on the side surface may affect the optical design and the manufacturing process thereof. Thus, the said design shall be improved. Additionally, limited by the working principle of the electro-wetting liquid lens, the package of the electro-wetting liquid lens 60 shall be made of metal or electrical conductor, so that the selections of the materials are limited. Furthermore, because the fluid stated packaging shield thereof has a larger coefficient of temperature expansion, the liquid lens is packaged or operated with leakage when the temperature changes in environment.

The recovering speed from emulsion is one of the important performance indexes to the liquid combination. The emulsion means that two different phases which are not solvable and mixable with each other, such as water and hexane. Since the water and the hexane are not solvable with each other, the water and the hexane will be separated into two layers because of different densities. The lower density material is on top and the higher density material is at the bottom. It is the most stable condition for thermodynamic. However, while an external force is applied and one of the said liquid separated in another liquid in drop shaped, it is state of emulsion which is relatively unstable.

Figure 2:
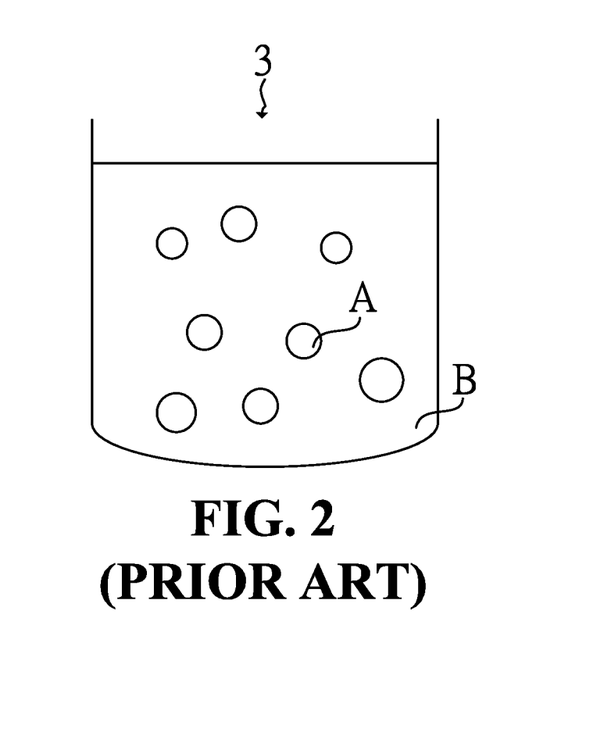
FIG. 2 illustrates a schematic diagram of an emulsive liquid combination in prior art.

Please refer to the FIG. 2. FIG. 2 illustrates a schematic diagram of an emulsive liquid combination in prior art. As shown in FIG. 2, A is the phase that the material separated into drop shaped, called as dispersed phase. B is called as continuous phase. The dispersed phase A and the continuous phase B can be gas, liquid or solid. However, more compositions are required since the plurality of the requirement of the liquid combination of the liquid lens, which may cause the emulsion problem. The emulsified liquid combination 3 may cause liquid lens atomized and opaque. Accordingly, if the emulsion problem cannot be solved, the performance of the liquid lens shall be affected hugely because of the long recovering time thereof.

Accordingly, the present invention discloses a liquid combination for dielectric liquid lens so as to solve the said problem.

SUMMARY OF THE INVENTION

Accordingly, a scope of the invention is to provide a liquid combination for a dielectric liquid lens. The liquid combination comprises an oil phase liquid and an aqueous phase liquid. The oil phase comprises a silicon oil which is polymerized by siloxane. The aqueous phase liquid comprises solution mixed with alcohol and water.

Wherein, the liquid lens is a dielectric liquid lens.

The oil phase liquid is composed of the silicon oil polymerized by siloxane and an organic compound liquid according to a first predetermined ratio. Wherein, the organic compound liquid is selected from the group comprising toluene, o-xylene, m-xylene, 1-bromo-3-chlorobenzene, 1,3-dichlorobenzene, dibromohexane, bromobenzene, 1-chloronaphthalene and 1,10-dichlorodecane. In practice, the organic compound liquid is toluene. The first predetermined ratio is a weight percent concentration of tetraethylene glycol/deionized water about 11%.

The aqueous phase liquid is composed of an alcohol and deionized water according to a second predetermined ratio. Wherein, the alcohol is selected from the group comprising diethylene glycol, 1,3-propylene glycol, glycerol, diethylene glycol, triethylene glycol and tetraethylene glycol. Additionally, the alcohol is tetraethylene glycol. The second predetermined ratio is a weight percent concentration of tetraethylene glycol/deionized water and equal to 100%. Furthermore, the second predetermined ratio is a weight percent concentration of tetraethylene glycol/deionized water in a range of 40% to 50%.

Compared to the prior art, the liquid combination for the liquid lens can meet the specification and have the fast speed which is recovered from the emulsion.

The objective of the present invention will no doubt become obvious to those of ordinary skill in the art after reading the following detailed description of the preferred embodiment, which is illustrated in following figures and drawings.

DETAILED DESCRIPTION OF THE INVENTION

The invention is to provide a method for tuning a photonic crystal. The photonic crystal has a plurality of voids and is immersed in a predetermined liquid. The predetermined liquid has a refractive index. The method for tuning the photonic crystal is used to control a liquid-solid affinity for adjusting a volume of the voids occupied by the predetermined liquid. An equivalent refractive index of the voids can be changed to adjust a reflection spectrum and a transmission spectrum of the photonic crystal accordingly. Thus, the color of the photonic crystal can be dynamically tuned.

Figure 3:
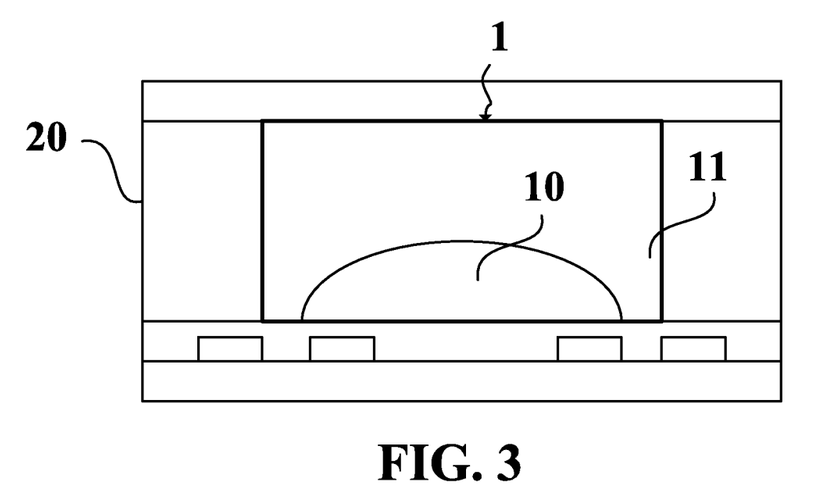
FIG. 3 illustrates a cross sectional view of a liquid combination for a liquid lens according to an embodiment of the invention.

Please refer to FIG. 3. FIG. 3 illustrates a cross sectional view of a liquid combination for a liquid lens according to an embodiment of the invention. As shown in the FIG. 3, the present invention discloses a liquid combination 1 for a liquid lens 20. The liquid combination 1 comprises an oil phase liquid 10 and an aqueous phase liquid 11. The oil phase liquid 10 comprises a silicon oil polymerized by siloxane (not shown in figures). The aqueous phase liquid 11 comprises a solution mixed by alcohol and water (not shown in figures). Accordingly, liquid combination previously described having the best emulsion recovery rate under the condition described in the present specification. The liquid combination 1 of the invention for the liquid lens 20 can meet the specification and have the fast speed which is recovered from the emulsion.

The liquid lens 20 is a dielectric liquid lens. In practice, the dielectric liquid lens can be classified into two different types by the requirements for physical specification and heat test. The liquid combination 1 shall meet the physical specification in order to let liquid lens 20 have the best performance in actual practice. Additionally, the liquid combination 1 shall meet the requirement of the heat test so that the liquid lens 20 can be commercialized. In practice, the density of the oil phase liquid 10 which is mixed with the silicon oil polymerized by siloxane shall be calculated in advance to know whether the density of the oil phase liquid 10 is equal to the solution mixed with alcohol and water of the aqueous phase liquid 11 or not.

Figure 4:
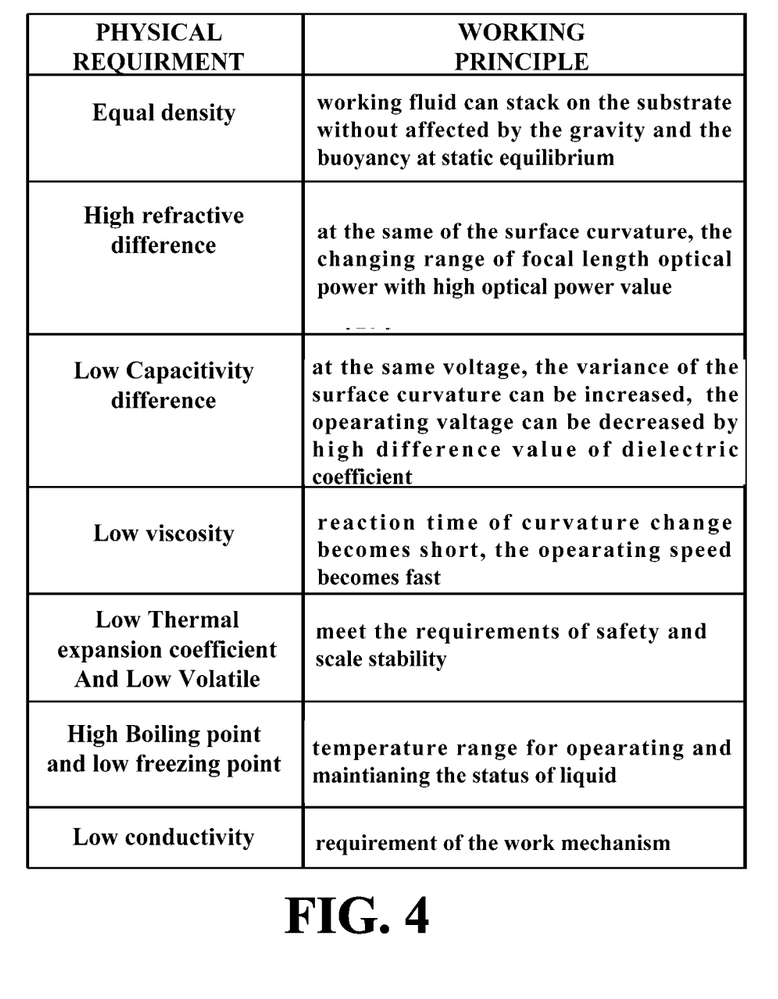
FIG. 4 illustrates physical specification of a liquid combination for a dielectric liquid lens according to an embodiment of the invention.
Figure 5:
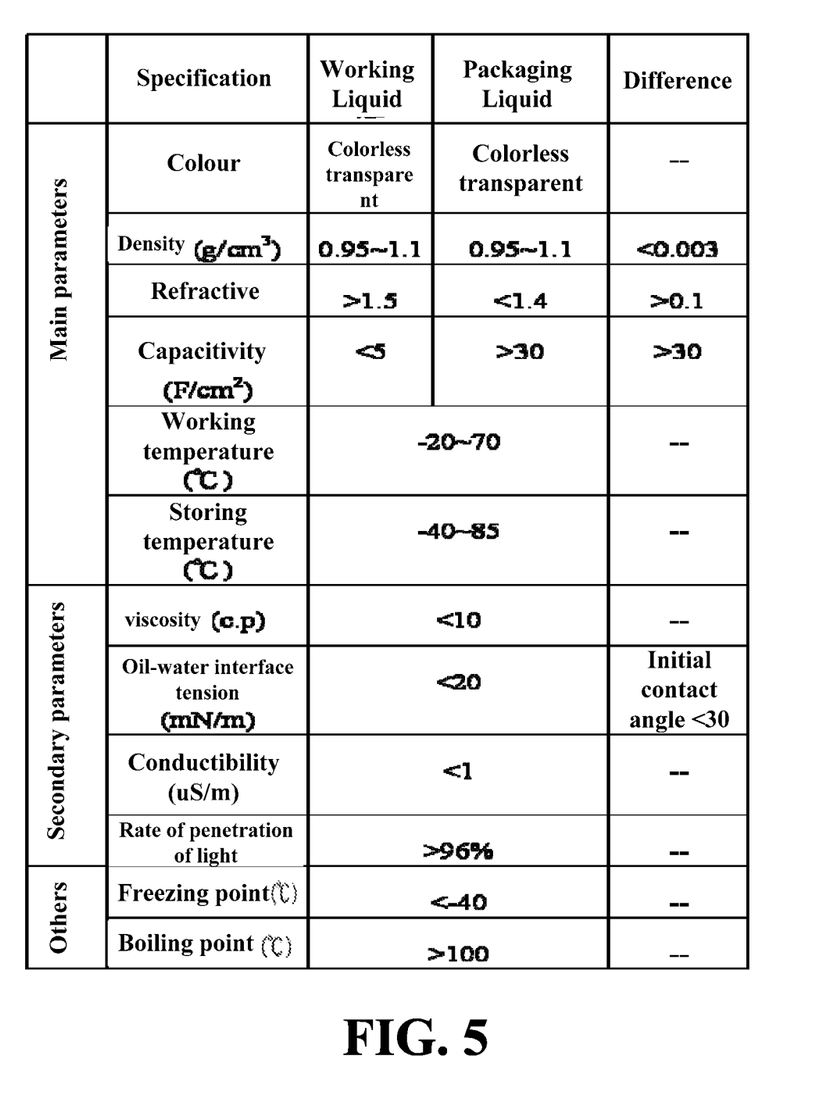
FIG. 5 illustrates numerical ranges of a liquid combination which can meet physical specification for a dielectric liquid lens according to an embodiment of the invention.

Please refer to FIG. 4 and FIG. 5. FIG. 4 illustrates physical specification of a liquid combination for a dielectric liquid lens according to an embodiment of the invention. FIG. 5 illustrates numerical ranges of a liquid combination which can meet physical specification for a dielectric liquid lens according to an embodiment of the invention. The liquid combination 1 shall meet the physical specification requirement.

Figure 6:
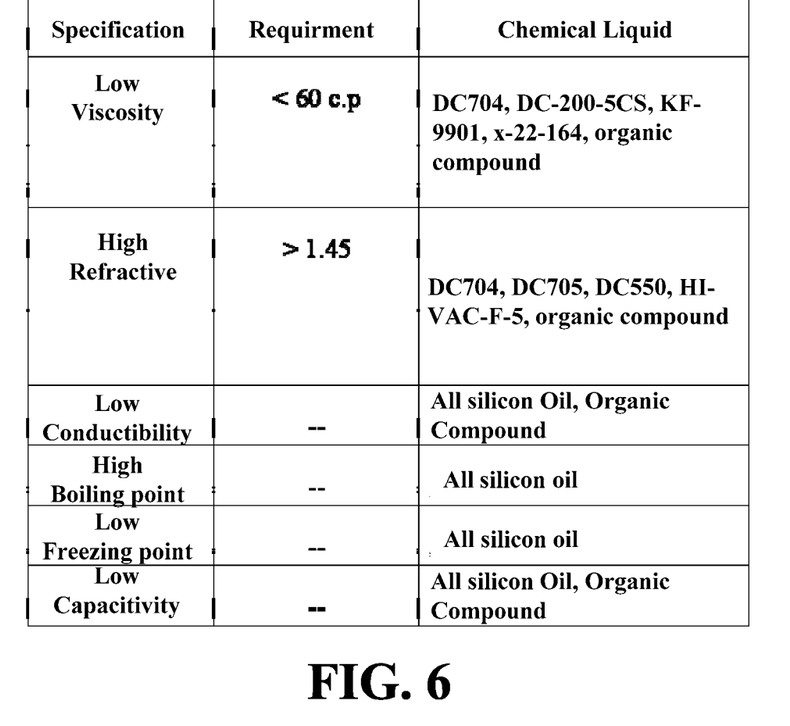
FIG. 6 illustrates a group of solutions which may meet the physical specification of the oil phase liquid for a dielectric liquid lens according to an embodiment of the invention.

Please refer to FIG. 6. FIG. 6 illustrates a group of solutions which may meet the physical specification of the oil phase liquid for a dielectric liquid lens according to an embodiment of the invention. As shown in FIG. 6, the group of solutions will be selected to meet the physical specification of the oil phase liquid 10. Please refer to FIG. 4 and FIG. 5 and FIG. 6 again, the main composition of the oil phase liquid 10 is silicon oil polymerized by siloxane. Additionally, an organic compound liquid will be added to meet the physical specification of the oil phase liquid 10.

In practice, liquid lens 20 shall be made with a freezing point below than −20° C., the ideal freezing point shall be below than −40° C. One of the properties of the silicon oil polymerized by siloxane is low freezing point. Additionally, the silicon oil polymerized by siloxane is fixed with organic compound liquid easily because of low polarity. Thus, the oil phase liquid 10 is composed of the silicon oil polymerized by siloxane and organic compound liquid in the invention. Furthermore, the oil phase liquid 10 is composed of the silicon oil polymerized by siloxane and the organic compound liquid according to a first predetermined ratio.

Figure 7:
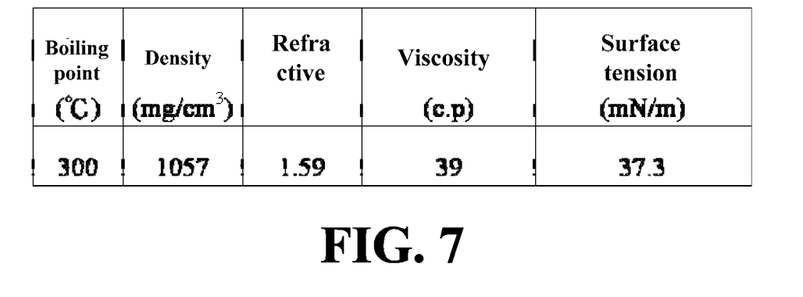
FIG. 7 illustrates basic physical properties of DC704 of a liquid combination for a dielectric liquid lens according to an embodiment of the invention.

Please refer to FIG. 7. FIG. 7 illustrates basic physical properties of DC704 of a liquid combination for a dielectric liquid lens according to an embodiment of the invention. For increasing the difference value of the refraction index between the oil phase liquid 10 and the aqueous phase liquid 11, the silicon oil polymerized by siloxane with high refraction index will be selected. To be noticed, the silicon oil polymerized by siloxane with high phenyl comprises high phenyl, chloro and bromo, so that the refraction index and the density of the silicon oil polymerized by siloxane will be increased. Additionally, because of the high polarity of the phenyl, chloro and bromo, the probability of the molecule of the silicon oil polymerized by siloxane will be increased. Thus, the viscosity of the silicon oil polymerized by siloxane will be increased. To meet the requirements of high refraction index and low viscosity, the DC704 is a best choice. The density of the DC704 is close to the density of the solution mixed with alcohol and water. Wherein, a ratio of phenyl/silicyl of the DC704 is 1.33.

Please refer to FIG. 5 FIG. 6 and FIG. 7 again. The main composition of the oil phase liquid 10 is DC704. However, the viscosity of the DC704 is 39 c.p and higher than 10 c.p, the silicon oil polymerized by siloxane or organic compound liquid shall be added for adjusting the viscosity. Wherein, the organic compound liquid is selected from the group comprising toluene, o-xylene, m-xylene, 1-bromo-3-chlorobenzene, 1,3-dichlorobenzene, dibromohexane, bromobenzene, 1-chloronaphthalene and 1,10-dichlorodecane. The viscosity of the toluene is 0.59 c.p.

The viscosity of the DC704 added by 20% toluene is 8.32 c.p, which is below 10 c.p for physical requirements. However, the density of the toluene is 867 mg/cm$^3$ and the density of the oil phase liquid 10 will be decreased to 1018 mg/cm$^3$. Thus, the quantity of the toluene added into the oil phase liquid 10 cannot be too high. If the 10% toluene is added into the DC704, the viscosity of the oil phase liquid 10 will become 15.4 c.p. Because the viscosity and the density of the oil phase liquid 10 cannot be balanced, the viscosity shall be sacrificed.

Figure 8:
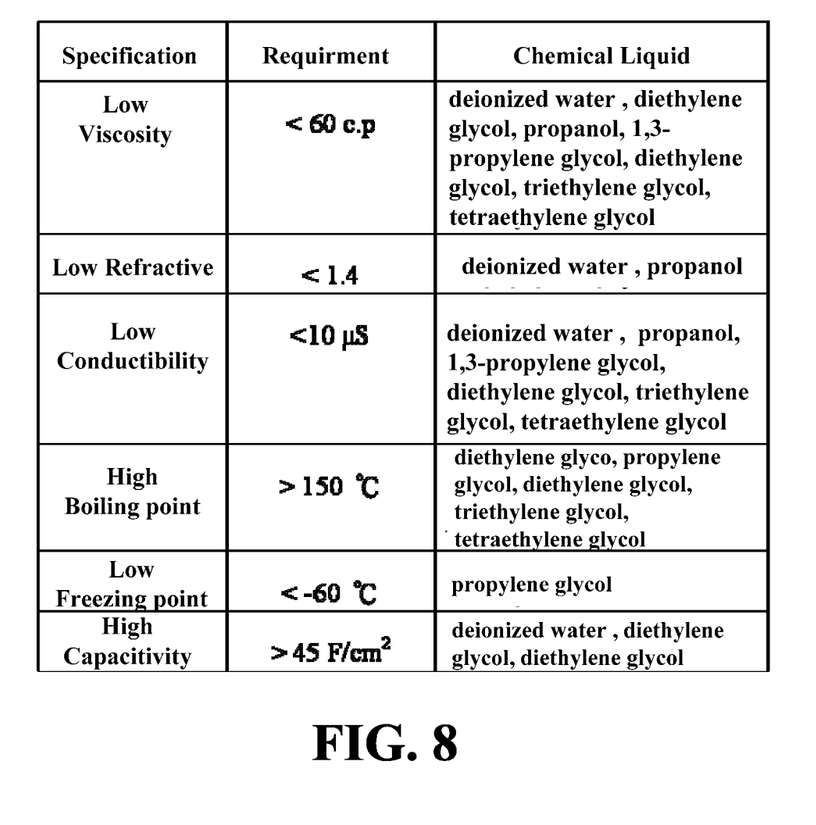
FIG. 8 illustrates a group of chemical liquids which may meet the physical specification of the aqueous phase liquid for a dielectric liquid lens according to an embodiment of the invention.

Please refer to FIG. 8. FIG. 8 illustrates a group of chemical liquids which may meet the physical specification of the aqueous phase liquid for a dielectric liquid lens according to an embodiment of the invention. Additionally, the aqueous phase liquid 11 shall meet the physical specification shown in FIG. 4 and FIG. 5.

Figure 9:
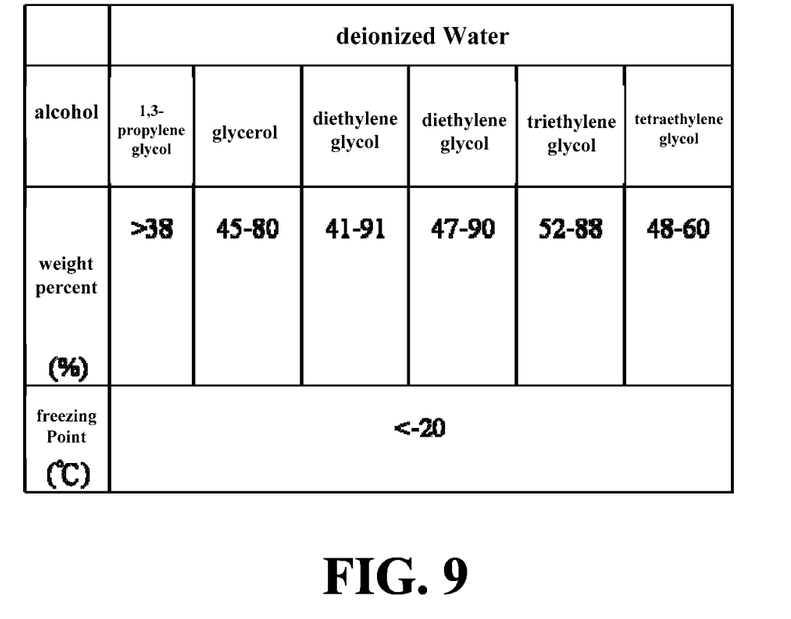
FIG. 9 illustrates alcohols with freezing points below than −20° C. of a liquid combination for a dielectric liquid lens according to an embodiment of the invention.

The solution mixed with alcohol and water is composed of an alcohol and deionized water according to a second predetermined ratio. The polarity will affect the solubility of the solution mixed with alcohol and water. To meet the requirement of the solubility, the difference value of the polarity between the oil phase liquid 10 and the aqueous phase liquid 11 shall be increased, the liquid with high polarity will be selected, such as diethylene glycol, 1,3-propylene glycol or diethylene glycol. The alcohols can be mixed with water absolutely by hydrogen bond. The carbon chain of butanol and pentanol are long, so that the polarity will be decreased Please refer to FIG. 9. FIG. 9 illustrates alcohols with freezing points below than −20° C. of a liquid combination for a dielectric liquid lens according to an embodiment of the invention. For meeting the requirement of the freezing point, the refraction index of the solution mixed with alcohol and water becomes lower as possible. At atmospheric pressure, the freezing point of the deionized water is 0° C. To decrease the freezing point of the deionized water, the alcohol shall be added with certain ratio. The molecule of the alcohol can enlarge the molecule distance of the deionized water, so that the curing temperature and the freezing point of the deionized water will be decreased. 1,3-propylene glycol and glycerol are famous cryoprotectant. The freezing point of the 1,3-propylene glycol liquid will become lower and lower if 1,3-propylene glycol is increased. If the weight percent concentration of the 1,3-propylene glycol liquid is more than 38%, the freezing point will lower than −20° C. If the weight percent concentration of glycol liquid is in a range of 45% to 80%, the freezing point will also lower than −20° C. The liquids of diethylene glycol, triethylene glycol, and tetraethylene glycol do not be used commonly, but the liquids are antifreezing. The requirement of the freezing point of the aqueous phase liquid 11 is below than −20° C., the solution mixed with alcohol and water are listed in FIG. 9.

The density of the 1,3-propylene glycol is close to the water and the densities of other alcohols are larger than water. Thus, to consider of the requirements of density and freezing point, the aqueous phase liquid 11 is selected as 40%, 50% or 60% solution mixed with alcohol and water. The alcohol is selected from the group comprising diethylene glycol, 1,3-propylene glycol, glycerol, diethylene glycol, triethylene glycol and tetraethylene glycol.

Furthermore, the refraction index and viscosity of the solution mixed with alcohol and water will be increased if the oxygen atoms or the hydroxyl group of the alcohol are increased. To balance the refraction index and the viscosity, the selections of the solution mixed with alcohol and water are limited. To meet the requirement of the refraction index, the 40% tetraethylene glycol is best. The refraction index of the 40% tetraethylene glycol is 1.3831. If liquid combination 1 is composed of the DC704 and the tetraethylene glycol, the difference value of the refraction index is 0.2069 and meets the requirement of the refraction index.

The liquid combination 1 shall meet the requirements of the physical specification and the heat test at the same time. The heat test comprises thermal cycle test and storing temperature test. The thermal cycle test is to seal the liquid combination 1 in a glass bottle and put the glass bottle into a temperature-controlled cabinet. One cycle means that the temperature is increased from 40° C. to 95° C. in 50 minutes and then decreased from 95° C. to 45° C. in 50 minutes. After repeating the cycle in 24 hours, the liquid combination 1 becomes atomized opaque. Measuring the recovering time when the liquid combination 1 becomes transparent. The storing temperature test is to put the liquid combination 1 into a temperature-controlled cabinet. After maintaining the liquid combination 1 at 85° C. in 96 hours, the liquid combination 1 becomes atomized opaque and measures the recovering time.

In the invention, the maintaining time is set for 1 hour in the storing temperature test. The maintaining time is 70° C. After the heat test, observes the relationship between the time and the transparency. Take 8 hours as an observation unit to find out the combination with best recovering time.

Figure 10:
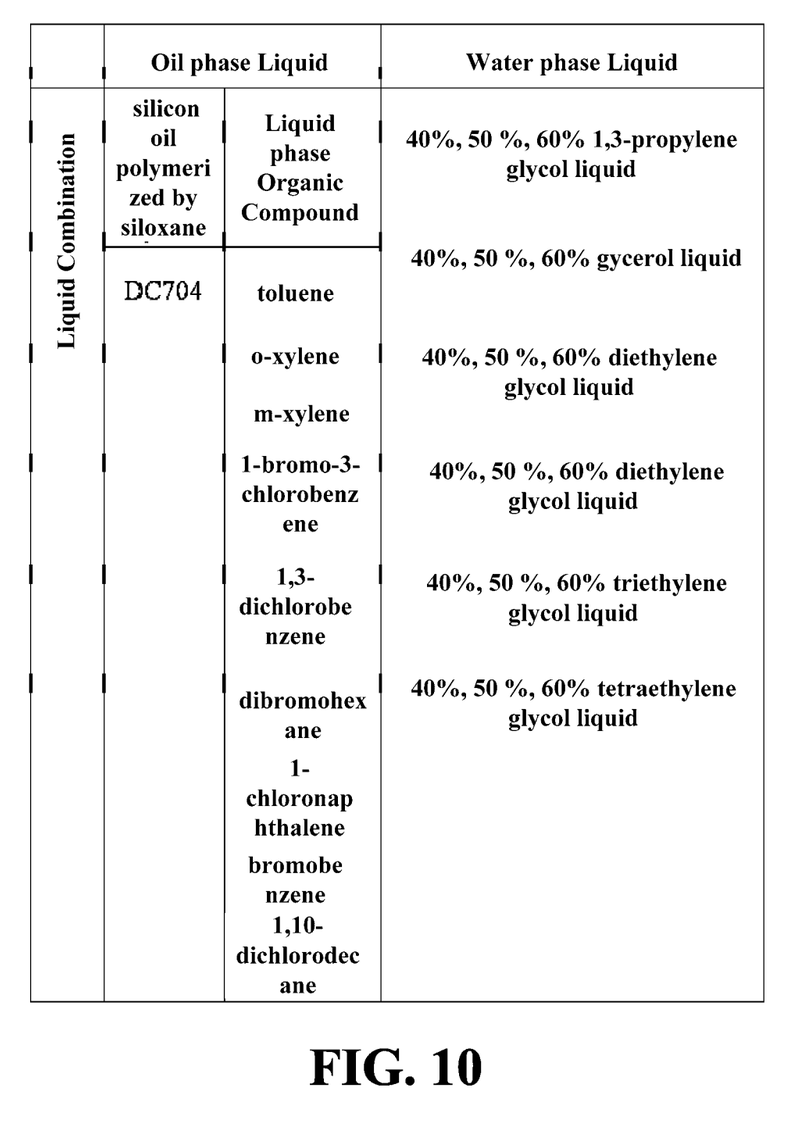
FIG. 10 illustrates the heat test of a liquid combination for a dielectric liquid lens according to an embodiment of the invention.

Please refer to FIG. 10. FIG. 10 illustrates the heat test of a liquid combination for a dielectric liquid lens according to an embodiment of the invention. The liquid combination 1 for heat test is listed in FIG. 10. The main composition of the oil phase liquid 10 is DC704 and the organic compound liquid is added into the oil phase liquid 10. The solution mixed with alcohol and water is selected with different kinds but the same ratio for aqueous phase liquid 11. Additionally, to find out the best liquid combination 1 which can meet the requirements of the physical specification and heat test by the following heat test steps:

(1) Step I:

The oil phase liquid 10 is composed of DC704 merely. Then, different alcohols and deionized water are mixed with the oil phase liquid 10. The alcohols can be 1,3-propylene glycol, glycerol, diethylene glycol, diethylene glycol, triethylene glycol and tetraethylene glycol.

Because the main object is to measure the thermal sensitivity of the DC704 for hydrophilic liquids, it does not matter that the liquid combination 1 cannot meet the specification. The ratio of oil phase liquid 10/aqueous phase liquid 11 is 1 g/3 g. The liquid combination 1 is sealed in a glass battle at 70° C. in 1 hour. Then, the DC704 mixed with deionized water can be recovered from atomized and opaque status in 6 hours. Other alcohols cannot recover from atomized and opaque status in 8 hours.

(2) Step II:

The oil phase liquid 10 is composed of DC704 merely. To decrease the freezing point of the aqueous phase liquid 11 below than −20° C., at least 40% alcohol shall be added into deionized water.

The refraction index will become higher due to the solution with high concentration, so that the composition of the aqueous phase liquid 11 is limited to 40%, 50% and 60% solution mixed with alcohol and water. The conditions of the heat test in step I and in step II are the same. The 50% glycerol liquid becomes transparent after 8 hours. The 40% tetraethylene glycol liquid becomes transparent after 7 hours. The 50% tetraethylene glycol liquid becomes transparent after 6 hours. Other liquids cannot recover from atomized within 8 hours. The DC704 is mixed with 50% tetraethylene glycol with shortest recovering time at present.

(3) Step III:

The viscosity of the DC704 is 39 c.p. Thus, the DC704 shall be mixed with organic compound liquid to decrease the viscosity of the DC704. The organic compound liquid is selected from the group comprising toluene, o-xylene, m-xylene, 1-bromo-3-chlorobenzene, 1,3-dichlorobenzene, dibromohexane, bromobenzene, 1-chloronaphthalene and 1,10-dichlorodecane. The said organic compound liquids have the same features of small molecular mass, low viscosity and high refraction index, but different densities. The lowest density is 859.6 mg/cm$^3$ of the m-xylene. The highest density is 1,630.2 mg/cm$^3$ of the 1-bromo-3-chlorobenzene. The density of the DC704 is 1,057 mg/cm$^3$. If the aqueous phase liquid 11 is 50% tetraethylene glycol, the density is 1,057 mg/cm$^3$. To control the density of the oil phase liquid 10 after adding the organic compound liquid into the DC704, the addition ratio of the organic compound liquid is 10%. Then, the said DC704 is mixed with the 50% tetraethylene glycol liquid for the heat test. The conditions of the heat test in step III and in step I are the same. The 10% o-xylene becomes transparent after 7 hours. The 10% dibromohexane becomes transparent after 6 hours. However, the 10% toluene becomes transparent after 3 hours. Accordingly, the DC704 composed of 10% toluene and mixed with 50% tetraethylene glycol liquid has the shortest recovering time. The density of 50% tetraethylene glycol liquid is 1,078 mg/cm³. The density of DC704 composed of 10% toluene is 1,034.3 mg/cm³. The difference value is 43.7 mg/cm³.

(4) Step IV:

According to the step III, the difference value of the density of the oil phase liquid 10 and the aqueous phase liquid 11 is 42 mg/cm³. To decrease the said difference value, the composition of the oil phase liquid 10 is fixed and the solution mixed with alcohol and water is decreased to 40%. Thus, the ratio of the solution and the deionized water will be increased and the density of the aqueous phase liquid 11 can be decreased. The conditions of the heat test in step IV and in step I are the same. The recovering time of the 40% tetraethylene glycol is 4 hours. The difference value of the density of the oil phase liquid 10 and the aqueous phase liquid 11 is 27.7 mg/cm³. The difference value of the density is decreased but the recovering time is increased. Accordingly, the difference value of the density and the recovering time shall achieve a balance.

If the recovering time of the liquid combination 1 is a top priority, the oil phase liquid 10 is composed of 10% toluene mixed with DC704, the aqueous phase liquid 11 is composed of 50% tetraethylene glycol. If the difference value of the density of the liquid combination 1 is a top priority, the oil phase liquid 10 is composed of 10% toluene mixed with DC704, the aqueous phase liquid 11 is composed of 40% tetraethylene glycol. For obtaining the best liquid combination 1 with smaller difference value of the density, the ratio of the tetraethylene glycol can be changed in a range of 40% to 50%. Accordingly, the recovering time is in a range of 3 hours to 4 hours. That is to say, the first predetermined ratio is a weight percent concentration of toluene/DC704 about 11%. The second predetermined ratio is a weight percent concentration of tetraethylene glycol/deionized water and equal to 100%. To meet different conditions, the second predetermined ratio also can be a weight percent concentration of tetraethylene glycol/deionized water in a range of 40% to 50%.

Compared to the prior art, the liquid combination for the liquid lens can meet the specification and have the fast speed which is recovered from the emulsion.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A liquid combination for a dielectric liquid lens, comprising:
    an oil phase liquid comprising a silicon oil polymerized by siloxane and an organic compound liquid, the silicon oil polymerized by siloxane mixing with the organic compound liquid according to a first predetermined ratio; and
    an aqueous phase liquid comprising a solution mixed with alcohol and water, the solution mixed with alcohol and water being composed of an alcohol and deionized water according to a second predetermined ratio;
    wherein, both of the oil phase liquid and the aqueous phase liquid are non-conductive, and the first predetermined ratio and the second predetermined ratio are determined according to an emulsion recovering test.

2. The liquid combination of claim 1, wherein the organic compound liquid is selected from the group comprising toluene, o-xylene, m-xylene, 1-bromo-3-chlorobenzene, 1,3-dichlorobenzene, dibromohexane, bromobenzene, 1-chloronaphthalene and 1,10-dichlorodecane.

3. The liquid combination of claim 1, wherein the silicon oil polymerized by siloxane is DC704 with a ratio of phenyl/silicyl about 1.33, the organic compound liquid is toluene, the first predetermined ratio is a weight percent concentration of toluene/DC704 about 11%.

4. The liquid combination of claim 1, wherein the alcohol is selected from the group comprising diethylene glycol, 1,3-propylene glycol, glycerol, diethylene glycol, triethylene glycol and tetraethylene glycol.

5. The liquid combination of claim 1, wherein the alcohol is tetraethylene glycol, the second predetermined ratio is a weight percent concentration of tetraethylene glycol/deionized water and equal to 100%.

6. The liquid combination of claim 1, wherein the alcohol is tetraethylene glycol, the second predetermined ratio is a weight percent concentration of tetraethylene glycol/deionized water in a range of 40% to 50%.

* * * * *